March 25, 1952  P. MARTIN  2,590,781
ABSORPTION DYNAMOMETER
Filed Nov. 29, 1949
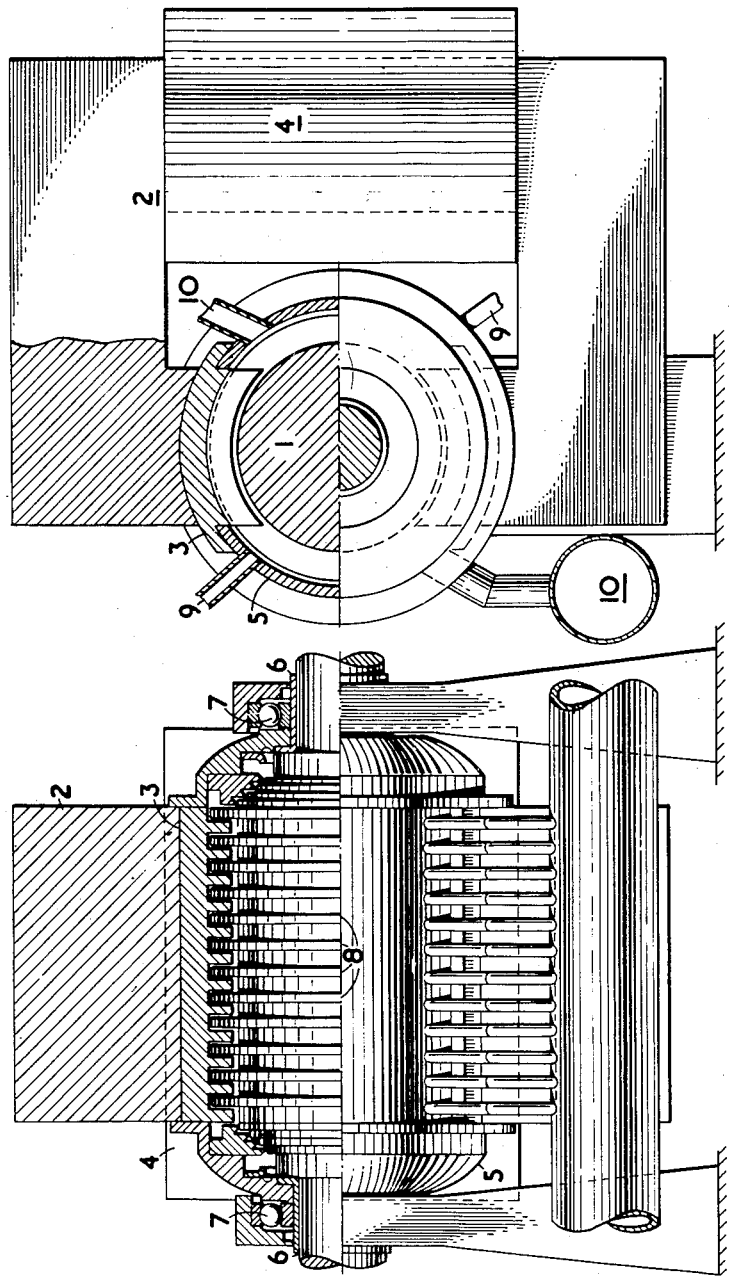
Inventor
Peter Martin
By Sturms, Davis, Miller & Mosher
Attorneys Patented Mar. 25, 1952

2,590,781

UNITED STATES PATENT OFFICE 2,590,781

ABSORPTION DYNAMOMETER

Peter Martin, Leicester, England, assignor to Power Jets (Research and Development) Limited, London, England, a British company Application November 29, 1949, Serial No. 130,026
In Great Britain December 15, 1948

2 Claims. (Cl. 172—285)

This invention relates to absorption dynamometers for measuring a rotational torque exerted by a power unit and more particularly to the kind in which the torque is transmitted from a rotor driven by the power unit to a floating stator co-operating with the rotor by the creation of magnetic fields between them, and, at the same time, power is dissipated in the form of heat which is generated by eddy currents resulting from changes in the density of magnetic flux of the magnetic fields in the rotor as it moves relatively to the stator.

In dynamometers of this kind as commonly used magnetic fields are created between stationary pairs of poles, a number of which are disposed circumferentially about a rotor of cylindrical form and are energised by a coil extending circumferentially about the rotor, the poles of each pair being spaced axially along the rotor with respect to one another. The total magnetic field in the rotor thus extends in a generally axial direction and eddy currents are created at the surface of the rotor, which suffers a variation in flux density between zero and a maximum value in passing the region of each pole. Suitable provision is made for the circulation of a cooling fluid to absorb the heat dissipated. While such an arrangement has been acceptable for dynamometers in general use, that is, when directly driven by power units operating in maximum rotational speeds of the order of 20,000 R. P. M., applications are foreseen in which maximum speeds of the order of 70,000 R. P. M. may be required (as, for example, when the dynamometer is directly driven by a high speed gas turbine power unit), when certain deficiencies in the arrangement described may be expected. For instance, the design of a dynamometer of the kind indicated for such high speed requirements is influenced by the factors, firstly, that the maximum speed of rotation of a rotor is limited by the permissible mechanical stresses occurring within it, and by the speed at which whirling in the rotor element may be expected; secondly, the minimum speed at which a given power is absorbed is dependent on the maximum change of magnetic flux in the rotor and, thirdly, the maximum power which can be absorbed is dependent on the ability to dissipate the heat generated in the rotor. The elimination of the possibility of whirling and the reduction of centrifugal stress produce a tendency toward rotors of reduced axial and diametrical dimensions which, being commensurate with reduced surface areas, entail reduced magnetic flux and cooling capacities.

In dynamometers having the known arrangement described, due to the axial and circumferential spacing of the poles and consequent comparatively wasteful use of the rotor surface area, it becomes increasingly difficult, for progressively increased rotor speeds, to reconcile the various limitations. Accordingly in my dynamometer a magnetic field having a direction generally normal to the axis of the rotor is created between two unlike stator magnetic poles disposed respectively at diametrically opposite sides of the rotor, and thus a point on the rotor surface may undergo a flux density variation between a maximum value in one sense and a maximum value in the opposite sense in passing successive poles. The magnetic poles may be of substantially similar axial dimension to the rotor, whilst their dimension in a direction normal thereto may be a substantial proportion of the rotor diameter, so that a large proportion of the curved surface of the rotor intersects the magnetic field. In this way, the most effective use may be made of a rotor of given dimensions.

According to the invention, the rotor comprises a cylindrical magnetic body having a plurality of radially upstanding, peripheral flanges, spaced in the axial direction to form shallow annular channels alternating with the upstanding flanges along the length of the rotor, with co-operating pole faces of complementary shape.

The invention will be more readily understood by reference to the accompanying drawings which illustrate diagrammatically, an absorption dynamometer intended for high speed operations, Fig. 1 being a half side elevation and half axial cross-section and Fig. 2 being an end elevation with the rotor and field pole in part diametral cross-section. With reference to these drawings, a magnetic circuit is formed by a rotor 1, opposed pole pieces 3, and an electromagnet comprising a core 2 (preferably laminated) and an energising coil 4. The rotor 1 is mounted in bearings 6 which are themselves supported by a floating stator casing 5, which also supports the pole pieces 3; this casing is made of non-magnetic material such as bronze or stainless steel. The complete assembly comprising the stator casing 5, pole pieces 3, core 2 and coil 4 is arranged to float about the rotor axis on bearing 7 so that torsional loads on it may be measured; to this end, the assembly is suitably counterbalanced. The rotor 1 is made of high tensile steel with suitable magnetic properties at the operating conditions, and is provided with evenly spaced peripheral flanges 8 alternating with shallow annular channels along the length of the rotor to afford adequate cooling area; the pole pieces 3 are of appropriate shape to correspond therewith. It will be seen that there are magnetic flux paths radially of the rotor across narrow air gaps between the roots of the grooves and the crests of the complementary flanges or ribs as well as in a perpendicular direction—i. e. parallel to the rotor axis—between the adjacent faces of flanges and ribs but that the magnetic flux path through the rotor body is in a direction generally normal to the rotor axis. The stator casing 5 is provided with inlet and outlet ports 9 and 10 respectively for the supply of cooling water which is directed in to the smaller diameter of the rotor between the ribs; the water is arranged to flow circumferentially in a direction opposite to the direction of rotation of the rotor.

I claim:

1. An eddy current type adsorption dynamometer wherein torque is transmitted by magnetic interaction from a rotor to a floating stator thereabout, the dynamometer comprising in combination a cylindrical magnetic rotor body having radially upstanding peripheral flanges alternating with shallow annular channels along the length of the rotor, and a floating bipolar stator field system with unlike magnetic poles respectively at diametrically opposite sides of the rotor, the faces of said poles being ribbed and grooved complementarily to the rotor to define therewith a magnetic flux path in the rotor body generally in a direction normal to the rotor axis but across the air gap partly in that said direction and partly in an axial direction.

2. An absorption dynamometer as claimed in claim 1, wherein the stator poles are substantially co-extensive with the curved surface of the rotor in both the axial and the diametrical directions.

PETER MARTIN.

REFERENCES CITED

The following references are of record in the file of this patent:

UNITED STATES PATENTS

| Number | Name | Date |
| --- | --- | --- |
| 152,772 | Sims | July 7, 1874 |
| 217,807 | Ludwig | July 22, 1879 |
| 459,810 | Conly | Sept. 22, 1891 |
| 1,293,310 | Bennett | Feb. 4, 1919 |
| 1,572,927 | Hellmund | Feb. 16, 1926 |
| 1,960,915 | Morse | May 29, 1934 |
| 2,367,163 | Winther | Jan. 9, 1945 |